(12) United States Patent
Katoh et al.

(10) Patent No.: US 8,112,173 B2
(45) Date of Patent: *Feb. 7, 2012

(54) POSITION ENSURING SYSTEM FOR OBLIQUE MACHINING IN FIVE-AXIS MACHINE TOOL

(75) Inventors: Kouichi Katoh, Numazu (JP); Takamasa Itoh, Shimizu-Cho (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/981,179

(22) Filed: Dec. 29, 2010

(65) Prior Publication Data

US 2011/0093115 A1    Apr. 21, 2011

Related U.S. Application Data

(63) Continuation of application No. 11/937,742, filed on Nov. 9, 2007, now Pat. No. 7,941,240.

(30) Foreign Application Priority Data

Nov. 10, 2006  (JP) ................................. 2006-305648

(51) Int. Cl.
    *G06F 19/00* (2011.01)
(52) U.S. Cl. ......... 700/191; 700/192; 700/193; 700/195
(58) Field of Classification Search .................. 700/186, 700/190, 191, 192, 193, 195
    See application file for complete search history.

(56) References Cited

U.S. PATENT DOCUMENTS

| 7,283,889 | B2 | 10/2007 | Otsuki et al. |
| 2001/0032056 | A1 | 10/2001 | Tanaka et al. |
| 2004/0050139 | A1 | 3/2004 | Comer et al. |

FOREIGN PATENT DOCUMENTS

| JP | 62-218808 | 9/1987 |
| JP | 63-109957 | 5/1988 |
| JP | 06-088192 | 3/1994 |
| JP | 2001-269839 | 10/2001 |
| JP | 2004-034168 | 2/2004 |
| JP | 2004-272887 | 9/2004 |
| JP | 2004-348350 | 12/2004 |
| JP | 2005-059102 | 3/2005 |
| JP | 2005-061834 | 3/2005 |

OTHER PUBLICATIONS

English Abstract of JP2004-034168.
Office Action issued in corresponding JP Appl 2006-305648 on May 18, 2010.

(Continued)

*Primary Examiner* — Ryan Jarrett
(74) *Attorney, Agent, or Firm* — DLA Piper LLP US

(57) ABSTRACT

A position ensuring system includes an A-axis calibration system which measures a displacement angle, which is an error between a target value and a measured value of the pivot angle of the spindle head about the A-axis, and corrects the pivot angle about the A-axis in such a manner that the displacement angle as measured with the corrected pivot angle as a target value fall within a tolerable range. A corrected data storage device stores the corrected pivot angle about the A-axis. An A-axis control system reads out the corrected pivot angle about the A-axis, the corrected pivot angle about the A-axis to pivot the spindle head when executing oblique machining of the inclined hole.

4 Claims, 7 Drawing Sheets

OTHER PUBLICATIONS

English Translation of Office Action issued in corresponding JP Appl 2006-305648 on May 18, 2010.
English Abstract of JP 2004-272887 published Sep. 30, 2004.
English Language Translation of JP 2004-272887 published Sep. 30, 2004.
English Abstract of JP 63-109957 published May 14, 1988.
English Abstract of JP 2004-348350 published Dec. 9, 2004.
English Language Translation of JP 2004-348350 published Dec. 9, 2004.
English Abstract of JP 62-218808 published Sep. 26, 1987.
Japanese Office Action issued in JP 2006-305648 on Mar. 18, 2011.
English Language Translation of Japanese Office Action issued in JP 2006-305648 on Mar. 18, 2011.
English Language Abstract of JP 2001-269839 published on Oct. 2, 2001.
English Language Translation of JP 2001-269839 published on Oct. 2, 2001.
English Language Abstract of JP 2005-059102 published Mar. 10, 2005.
English Language Translation of JP 2005-059102 published Mar. 10, 2005.
English Language Abstract of JP 2005-061834 published Mar. 10, 2005.
English Language Translation of JP 2005-061834 published Mar. 10, 2005.
English Language Abstract of JP 06-088192 published Mar. 29, 1994.
English Language Translation of JP 06-088192 published Mar. 29, 1994.

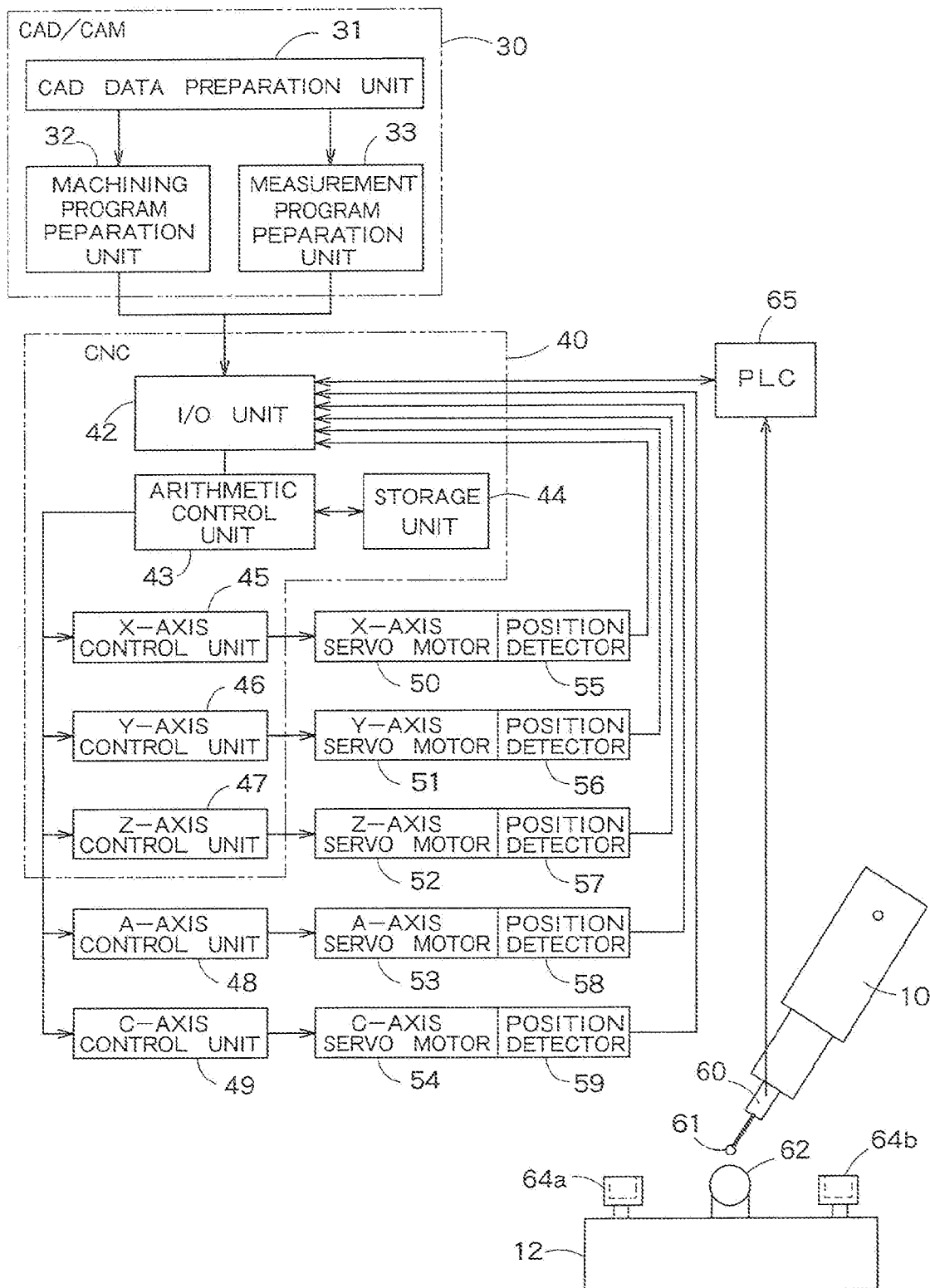
F I G. 5

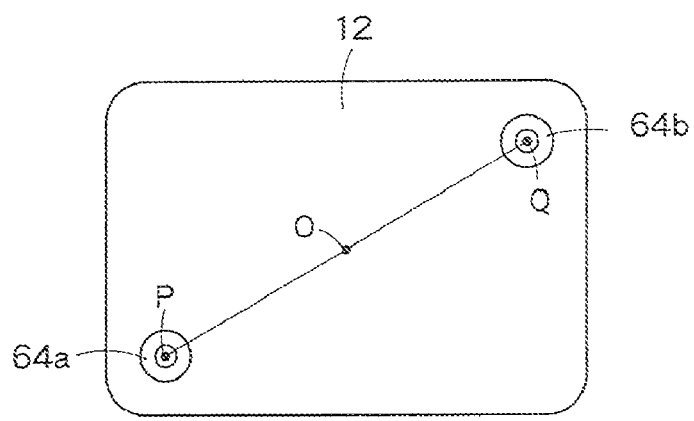
F I G. 10A
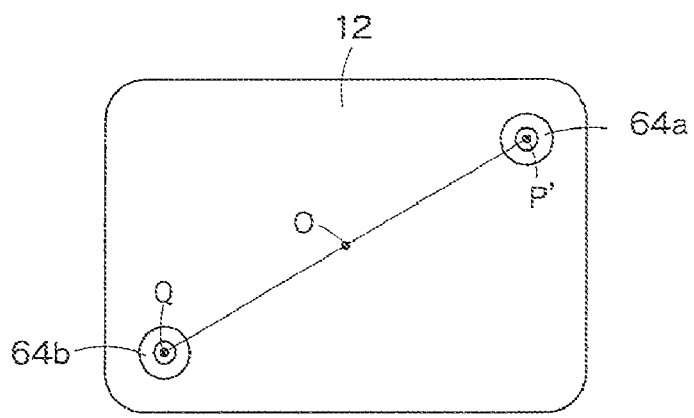
F I G. 10B
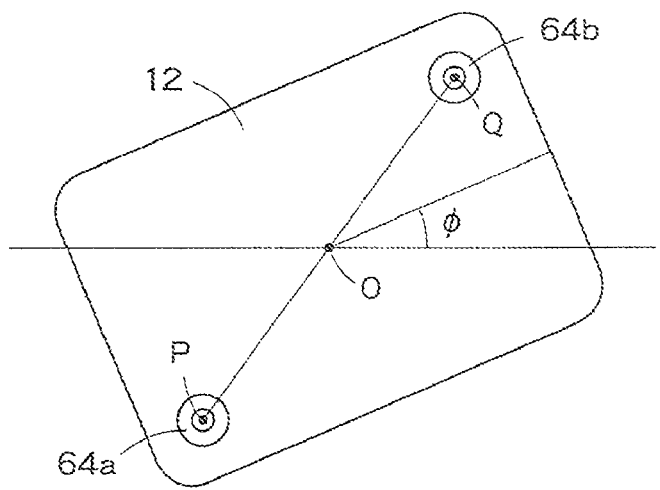
F I G. 10C

POSITION ENSURING SYSTEM FOR OBLIQUE MACHINING IN FIVE-AXIS MACHINE TOOL

CROSS-REFERENCE TO RELATED APPLICATIONS

This application is a continuation of U.S. application Ser. No. 11/937,742 filed Nov. 9, 2007. U.S. application Ser. No. 11/937,742 claims priority to Japanese Patent Application No. 2006-305648 filed Nov. 10, 2006. The entire contents of all of the applications mentioned above are incorporated herein by reference.

FIELD OF THE INVENTION

The present invention relates to a position ensuring system for a five-axis machine tool, and more particularly to a system which, when machining an inclined hole in a workpiece in a five-axis machine tool, such as a bridge-type machine tool having a pivotable spindle head, can compensate for an error in an A-axis, the pivot axis of a spindle head, and an error in a C-axis for indexing of a table.

BACKGROUND ART

A bridge-type machine tool is conventionally known as a typical five-axis machine tool. A bridge-type machine tool includes a spindle head provided on a cross rail and has, in addition to X-axis, Y-axis and Z-axis, an A-axis for pivoting of the spindle head and a C-axis for indexing of a table. An example of such a bridge-type machine tool is disclosed in Japanese Patent Laid-Open Publication No. 2004-34168. Five-axis machine tools, including the bridge-type machine tool, have been advantageously used for machining on a free-form surface, as typified by machining of a propeller.

In value-added machining of a mold, for example, shaping machining on a free-form surface has been the highest priority, and high-speed rotation of a spindle and high-speed following in axial movement have been required. To meet the requirements, higher-speed and higher-precision shaping machining with a five-axis machine tool has become realized.

These days, the environment surrounding manufacturing industry is changing greatly, and there is an increasingly stricter demand for shortening manufacturing time for machined products. There is a also a stronger demand by users for a five-axis machine tools that can better perform process-intensive combined machining. Such demands have led to a significant improvement in high-speed, high-precision machining, as described above. On the other hand, old-fashioned machining operations are still practiced in parallel, and the imbalance is becoming a problem.

For example, in machining of a mold for molding a large-sized resin product, such as an instrumental panel or a bumper of an automobile, besides advanced shaping machining, there are many machining operations for which advanced shaping machining is not necessarily required, such as machining of a hole for insertion of an extrusion pin, machining of a cooling cavity, undercut-shaping machining, etc.

Even today when high-speed machining is well-established, machining operations which are in no way high-speed and high-precision machining, such as machining of an extrusion pin hole, are currently practiced in a labor-intensive manner by skilled workers. This is because a number of extrusion pin holes are provided in a mold, and that the respective pin holes differ in the inclination and the direction.

To machine an extrusion pin hole with a five-axis machine tool, it is necessary to pivot the spindle to meet the inclination of the hole and to rotate the table to meet the direction of the hole. However, the machining inevitably involves an error in the tilt angle of the spindle head due to the weight of the spindle head, or a mechanical error in the rotation angle of the table. Conventional five-axis machine tools are thus not suited for machining of extrusion pin holes. Accordingly, a labor-intensive oblique drilling operation by a skilled worker is practiced separately from shaping machining with a five-axis machine tool.

In practice, for oblique drilling of extrusion pin holes, a skilled worker manually performs setup and drilling for each of the holes. Most of the operation time is spend on the setup work though only a short time is needed for actual drilling operation. Thus, the high-speed and high-precision performance of current machine tools is not fully utilized at present.

SUMMARY OF THE INVENTION

It is therefore an object of the present invention to provide a position ensuring system for oblique machining in a five-axis machine tool, which solves the above problems in the prior art and which, based on the inclination and the direction of an inclined hole to be machined, carries out measurement of an error in the pivot angle of a spindle head and an error in the rotation angle of a table before initiating machining of the hole, and can automatically correct the pivot angle of the spindle head and the rotation angle of the table upon machining of the hole, thereby precisely ensuring the position of the spindle head and the position of the table in the machining.

In order to achieve the object, the present invention provides a position ensuring system for correcting an error, caused by the influence of gravity and a mechanical error, in a five-axis machine tool having, in addition to X-axis, Y-axis and Z-axis, an A-axis for pivoting of a spindle head and a C-axis for rotation of a table, thereby ensuring the position of the spindle head in oblique machining of inclined holes in a workpiece, said system comprising: an A-axis calibration means for measuring a displacement angle, which is an error between a target value and a measured value of the pivot angle of the spindle head about the A-axis as the spindle head is pivoted to meet the inclination angle of an inclined hole to be machined in a workpiece, and correcting the pivot angle about the A-axis in such a manner that the displacement angle as measured with the corrected pivot angle fall within a tolerable range, before initiating machining of the workpiece, the measurement of displacement angle being carried out for all the inclined holes to be machined by execution of a measurement program prepared based on data on the shapes, including the inclination angles and the directions, of the inclined holes to be machined; a corrected data storage means for storing the corrected pivot angle about the A-axis for each of the inclined holes to be machined; and an A-axis control means for reading out the corrected pivot angle about the A-axis for each inclined hole upon executing a machining program for the workpiece by means of an NC apparatus, and instructing the corrected pivot angle about the A-axis to pivot the spindle head when executing oblique machining of the inclined hole.

In a preferred embodiment of the present invention, the position ensuring system further comprises: a C-axis calibration means for measuring a displacement angle, which is an error between a command value and a measured value of the rotation angle of the table about the C-axis as the table is rotated to meet the direction of an inclined hole to be machined in the workpiece, and correcting the rotation angle about the C-axis in such a manner that the displacement angle as measured with the corrected rotation angle fall within a tolerable range, the measurement of displacement angle being carried out for all the inclined holes to be machined by execution of the measurement program; a corrected data storage means for storing the corrected rotation angle about the C-axis for each of the inclined holes to be machined; and a C-axis control means for reading out the corrected rotation angle about the C-axis for each inclined hole upon executing the machining program, and instructing the corrected rotation angle about the C-axis to rotate the table when executing oblique machining of the inclined hole.

According to the present invention, the position ensuring system of the present invention enables oblique machining which is entirely different from the conventional oblique machining method in which a skilled worker manually performs drilling of inclined holes after manually performing setup for each hole to meet the inclination angle and the direction of the hole. Thus, the present system makes it possible to carry out literally NC-controlled, high-precision automated machining of all the inclined holes to be machined in a workpiece merely by executing a measurement program and a machining program which are prepared based on CAD data. Efficient oblique drilling, fully making use of the high speed of a five-axis machine tool, thus becomes possible. A remarkable increase in the efficiency of machining of a workpiece can be realized especially when the workpiece is a large-sized mold.

BRIEF DESCRIPTION OF THE DRAWINGS

FIG. 5 is a block diagram of a position ensuring system according to an embodiment of the present invention;

FIGS. 10A through 10C are diagrams illustrating a change in the position of the table during a measurement/calibration process.

DETAILED DESCRIPTION OF THE PREFERRED EMBODIMENT

A preferred embodiment of a position ensuring system for oblique machining in a five-axis machine tool according to the present invention will now be described with reference to the drawings.

Figure 1:
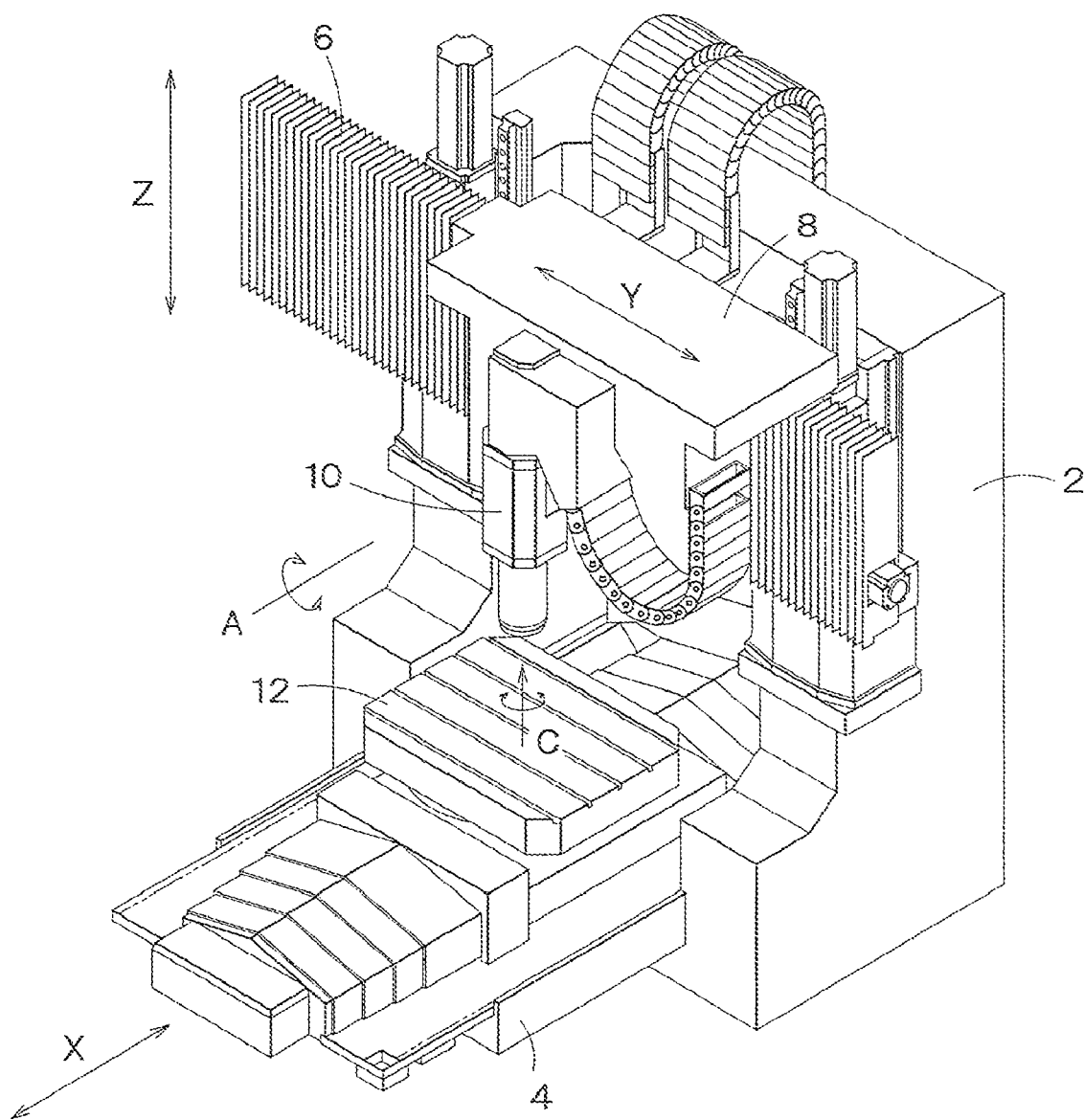
FIG. 1 is a perspective view of a bridge-type machine tool to which a position ensuring system according to the present invention is applied.

FIG. 1 shows a bridge-type machine tool, an exemplary five-axis machine tool to which a position ensuring system for machining of inclined holes according to the present invention is applied.

In FIG. 1, reference numeral 2 denotes a pair of columns and reference numeral 4 denotes a bed. A cross rail 6, bridging the columns 2 and extending horizontally, is mounted to the columns 2. The cross rail 6 is designed to be vertically movable. A saddle 8 is horizontally movably mounted to the cross rail 6. A spindle head 10 is pivotably mounted on the saddle 8 and is driven by a swivel pivot mechanism supported by a pivot rolling guide.

A table 12 is provided on the bed 4. The table 12 is a rotary table capable of 360-degree successive rotation, and is capable of turning a workpiece on the table 12 to an arbitrary direction.

Such a bridge-type machine tool has three linear axes, X-axis, Y-axis and Z-axis. The X-axis is a control axis for feeding the table 12 backward and forward, the Y-axis is a control axis for feeding the saddle 8 in the lateral direction, and the Z-axis is a control axis for feeding the cross rail 6 vertically. In addition to the X-axis, Y-axis and Z-axis, the machine tool has an A-axis as a pivot axis for pivoting the spindle head 10 through 30 degrees at the maximum to the right and left in the Y-Z plane, and a C-axis as a rotation axis for rotating the table 12 through an arbitrary angle in a successive manner.

Figure 2:
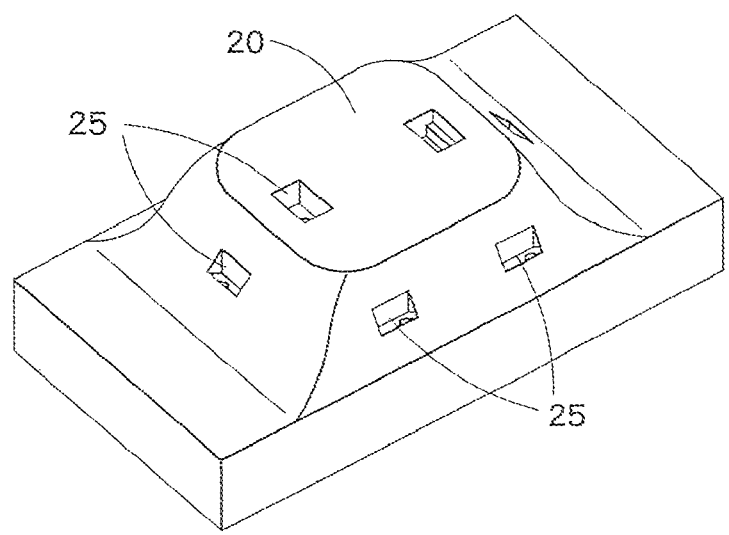
FIG. 2 is a perspective view of a workpiece to be machined by the five-axis machine tool of FIG. 1.

FIG. 2 shows an example of a workpiece in which inclined holes are machined by the bridge-type machine tool. In this embodiment the workpiece is a large-sized mold 20 for molding a large-sized resin molded product, such as an instrumental panel of an automobile. Such a large-sized mold 20 necessitates the use of extrusion pins for taking a molded product out of the mold. A number of extrusion pins need to be inserted into the large-sized mold 20 to take a molded product out of the mold. Accordingly, after carrying out shaping machining of a curved cavity for molded product to form the mold 20, a number of pin holes for insertion of extrusion pins are machined by oblique drilling in the mold 20.

Figure 3:
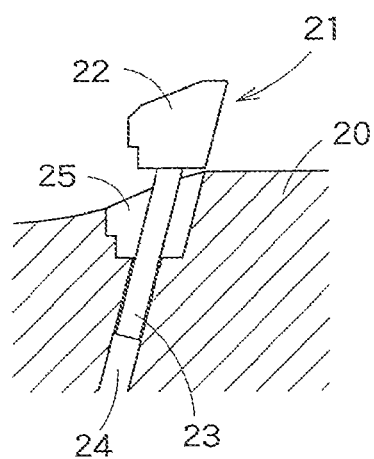
FIG. 3 is a cross-sectional diagram illustrating an extrusion pin hole to be machined in the workpiece of FIG. 2.

FIG. 3 is a cross-sectional diagram of the mold 20, illustrating the shape of a pin hole. An extrusion pin 21 is comprised of an insert 22 and a slide rod 23, and the insert 22 projects from the mold 20 to extrude a molded product. A slide rod hole 24 in which the slide rod 23 slides and a core pocket 25 in which the insert 22 is housed are machined in the mold 20. The slide rod hole 24 and the core pocket 25, as a whole, form a pin hole.

Figure 4:
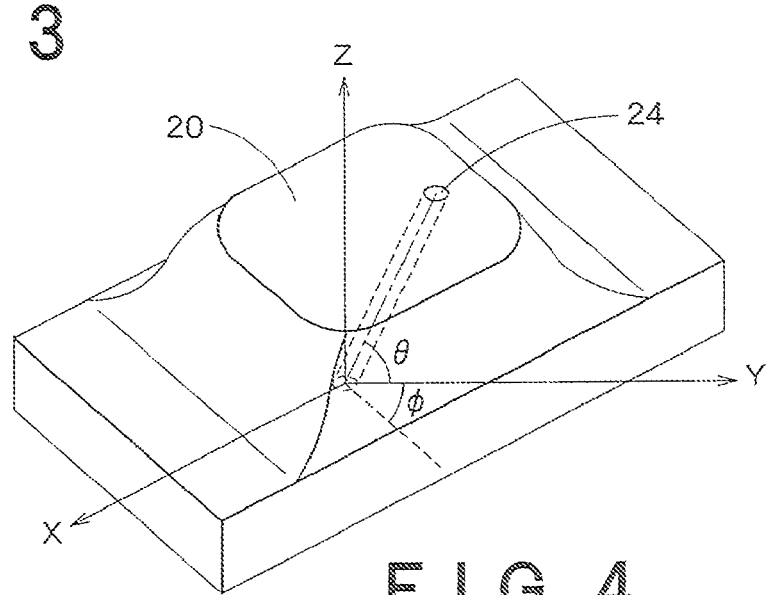
FIG. 4 is a diagram illustrating the inclination angle and the direction of the extrusion pin hole of FIG. 3.

Such a pin hole is usually inclined. With respect to the slide rod hole 24 shown in FIG. 4, for example, the hole 24 can be identified at least by data on the coordinates of a reference point set for the hole, the inclination angle $\theta$ of the hole 24, the direction $\phi$ of the axis of the hole 24, etc.

When placing the mold 20 on the table 12 and machining the slide rod hole 24 with a drill, the table 12 is rotated so as to meet the direction of the hole 24 and the spindle head 10 is kept in a tilted position meeting the inclination angle of the hole 24, and the drill is fed while numerically controlling the X-axis, the Y-axis and the Z-axis simultaneously, thereby machining the slid rod hole 24.

It is theoretically possible to formulate a program for machining all the inclined holes to be machined in the mold 20 from data on the coordinates of the reference points of the respective holes and on the inclination angles, directions and shapes of the respective holes, and to automate machining of all the holes in the mold 20 by execution of the machining program.

In fact, however, deflection is produced in the spindle head 10, the columns 2 and the cross rail 6 when the spindle head 10 is in a tilted position, causing a small error in the tilt angle. Furthermore, a mechanical error is inevitably produced when the table 12 is rotated. Because of such a tilt angle error and a directional error, it is practically very difficult to perform precision oblique machining.

Therefore, the bridge-type machine tool of FIG. 1 is provided with a position ensuring system according to the present invention, which ensures the position of the spindle head and the table in carrying out oblique machining, to correct errors that will be produced in the pivot angle of the spindle head 10 and in the angle of rotation of the table 12 due to the influence of gravity and a mechanical error.

FIG. 5 is a block diagram of a position ensuring system according to the present invention.

In FIG. 5, reference numeral 30 denotes a CAD/CAM machine, and reference numeral 40 denotes a CNC apparatus. The CAD/CAM machine 30 and the CNC apparatus 40 are connected by a communication means, such as serial communication or LAN.

The CAD/CAM machine 30 comprises a CAD data preparation unit 31 for preparing CAD data on the designing of a workpiece to be machined, which is the large-sized mold in this embodiment, a machining program preparation unit 32 for preparing a machining program for pin hole machining based on data on the positions of the reference points, the inclination angles, the directions, the shapes, etc. of pin holes, contained in the CAD data, and a measurement program preparation unit 33 for preparing a measurement program to perform calibration in order to obtain data necessary for correcting the pivot angle of the spindle head 10 or the angle of rotation of the table 12 based on the CAD data.

The CNC apparatus 40 is a CNC apparatus capable of synchronous five-axis control of X-axis, Y-axis, Z-axis, A-axis and C-axis, and basically comprises an input/output unit 42, an arithmetic and control unit 43, a storage unit 44, an X-axis control unit 45, a Y-axis control unit 46, a Z-axis control unit 47, an A-axis control unit 48, and a C-axis control unit 49.

The arithmetic and control unit 43, besides execution of the machining program, executes the measurement program in a user-specified manner. On execution of these programs, the X-axis control unit 45, the Y-axis control unit 46, the Z-axis control unit 47, the A-axis control unit 48 and the C-axis control unit 49 issue commands for the respective axes, and the commands are outputted to an X-axis servo motor 50, a Y-axis servo motor 51, a Z-axis servo motor 52, an A-axis servo motor 53 and a C-axis servo motor 54, respectively. The actual positions of the respective axes are detected by position detectors 55, 56, 57, 58, 59, and the position detection signals are fed back to the CNC apparatus 40.

When performing calibration by execution of the measurement program, a touch probe 60 is mounted to the font end of the spindle head 10. A calibration gage 62 is provided at a predetermined position on the table 12. The calibration gage 62 is a gage for measuring an error in the pivot angle of the spindle head 10 when it is pivoted. A pair of calibration gages 64a, 64b is also disposed on the table 12 at symmetrical positions with respect to the axis of rotation of the table. The calibration gage 62 is a spherical gage having high roundness, whereas the calibration gages 64a, 64b are cylindrical gages.

The touch probe 60 is provided with a terminal 61, and an on/off signal generated upon contact of the terminal 61 with the calibration gage 62, 64a or 64b is inputted via a programmable logic controller 65 into the CNC apparatus 40.

Figure 6:
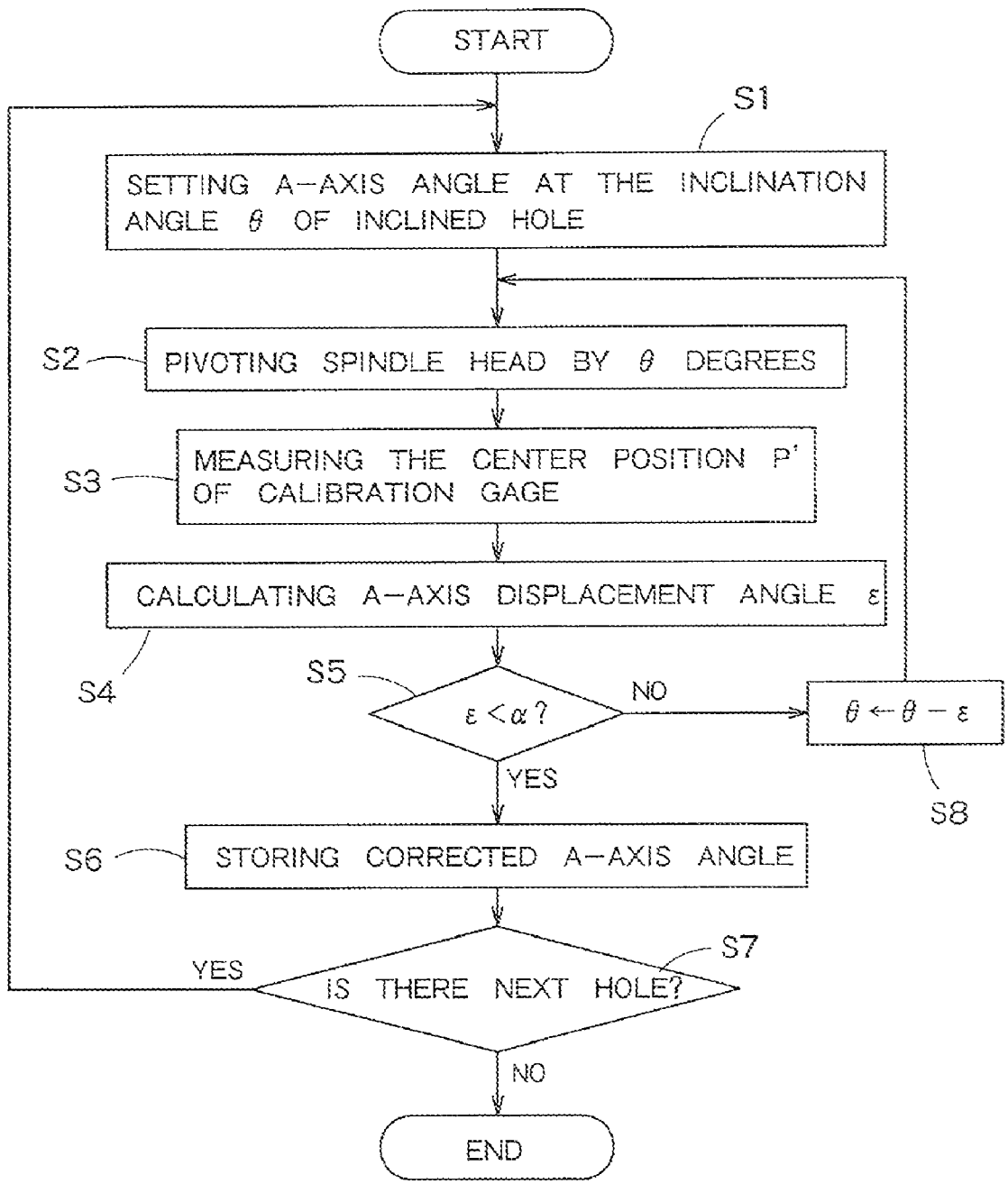
FIG. 6 is a flowchart of a program for measuring a displacement angle in the pivot angle of a spindle head about A-axis.

FIG. 6 is a flowchart showing the flow of a process of a measurement program that performs calibration to determine a correction amount of the pivot angle of the spindle head 10 about the A-axis when the spindle head 10 is pivoted.

Figure 7:
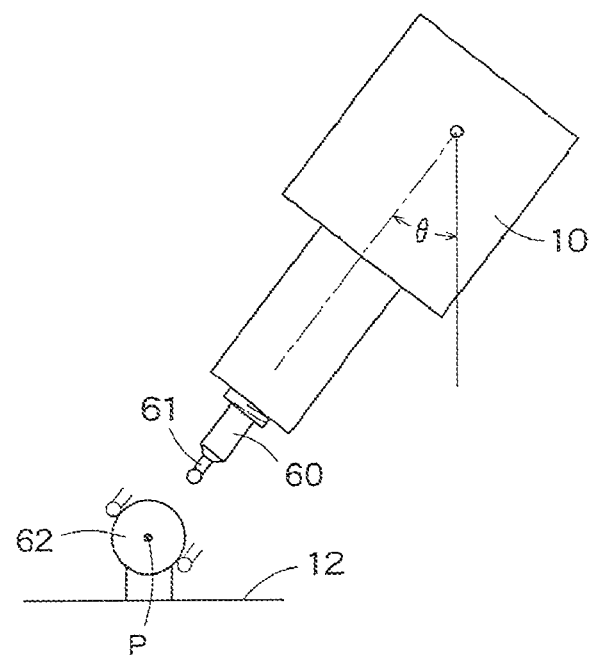
FIG. 7 is a diagram illustrating a change in the position of the spindle head during a measurement/calibration process.

FIG. 7 is a diagram illustrating a change in the position of the spindle head 10 upon execution of the measurement program. The center position P (X0, Y0, Z0) of the calibration gage 62 mounted on the table 12 has been measured and thus is known.

Inclined holes A1 to An are to be machined in the mold 20, with the inclination angles θ and the directions φ of the inclined holes A1 to An being represented as θ1 to θn and as φ1 to φn, respectively.

First, a pivot angle of the spindle head 10 about the A-axis is set (step S1). The angle is first set at the inclination angle θ1 of the inclined hole A1. A macro program is then executed which causes the spindle head 10 to pivot until the pivot angle reaches the inclination angle θ1 of the first inclined hole A1 while keeping the terminal 61 of the touch probe 60 in contact with the spherical surface of the calibration gage 62 (step S2). By the execution of the macro program, the pivot angle of the spindle head 10 about the A-axis theoretically becomes θ1 and the spindle head 10 becomes tilted as shown in FIG. 7.

In step S3, a macro program is executed which involves measuring a measured center point position P' (see FIG. 8) of the calibration gage 62 while keeping the spindle head 10 in the tilted position. In the macro program, the coordinates of four contact points between the touch probe 61 and the surface of the calibration gage 62 are measured, and the coordinates of the center position P' is calculated from the measured coordinates of the four points.

After thus determining the coordinates of the measured center position P', a displacement angle ε about the A-axis can be determined from the difference (error) from the known center position P in the following manner (step S4).

Figure 8:
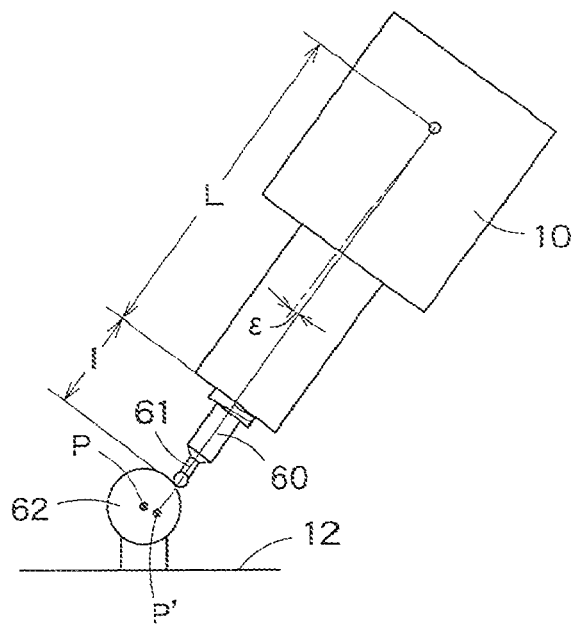
FIG. 8 is a diagram illustrating a displacement angle about A-axis.

In FIG. 8, assuming the distance from the pivot center of the spindle head 10 to the gage line of the spindle as "L" and the sensor length of the touch probe 60 as "l", the displacement angle ε about the A-axis can be determined from the sum "L+l" and the distance (error) "e" between the points P,P'.

In the subsequent step S5, comparison is made between the displacement angle ε about the A-axis and a predetermined tolerance α to determine whether the displacement angle ε is within the tolerable range. If the displacement angle ε is within the tolerable range, then the pivot angle "θ1−ε" about the A-axis is stored in the storage unit 44 (step S6), and the process is returned from step 7 to step 1 to proceed to measurement of the next inclined hole.

If the displacement angle ε is not within the tolerable range, the process proceeds to step S8. In step S8, the target value of the pivot angle about the A-axis, which has been set at θ1, is corrected to θ1−ε using the displacement angle. The process is then returned to step S2, and the measurement procedures of steps S2 to S5 are repeated with the pivot angle "θ1−ε" about the A-axis, and a determination is made as to whether the re-determined displacement angle ε about the A-axis is within the tolerable range (not exceeding the tolerance α). If the displacement angle ε is not within the tolerable range, the measurement procedures are again repeated.

When the displacement angle ε has come to fall within the tolerable range after the repetition of the measurement, the corrected pivot angle θ1 about the A-axis is stored in the storage unit 44 in step S6.

The same measurement and calibration process is executed for the next inclined hole A2. Thus, the spindle head 10 is pivoted about the A-axis by the same angle as the inclination angle θ2 of the inclined hole A2, and the center position of the calibration gage 62 is measured. The measurement is repeated until the displacement angle ε falls within the tolerable range, and the corrected pivot angle θ2 about the A-axis is stored in the storage unit 44. The same process is executed also for all the other inclined holes.

Figure 9:
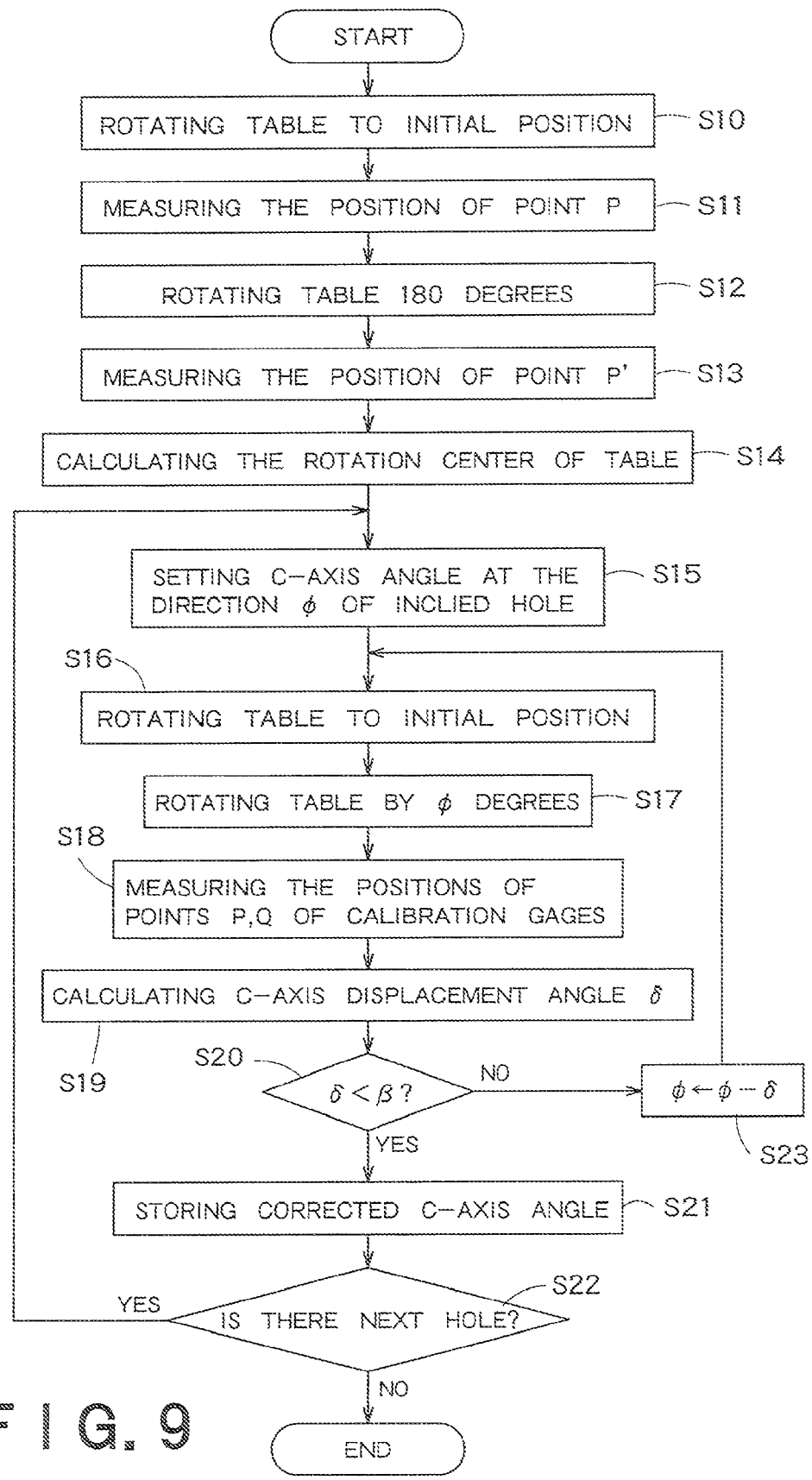
FIG. 9 is a flowchart of a program for measuring a displacement angle in the rotation angle of a table about C-axis.

FIG. 9 is a flowchart showing the flow of a process of a measurement program that performs calibration to determine a correction amount of the angle of rotation about the C-axis when the table 12 is rotated.

FIGS. 10A through 10C are diagrams illustrating a change in the position of the table 10 upon execution of the measurement program.

FIG. 10A shows the initial position of the table 12 (angle of rotation about C-axis=0°). On the table 12 are mounted the calibration gages 64a, 64b at points P, Q which are 180-degree symmetrical with respect to the rotation center O of the table 12.

The first steps S10 to S13 are to determine the position of the rotation center O of the table 12. In particular, in steps S10 and S11, the position of the point P in the initial position of the table 12 (angle of rotation about C-axis=0°) is measured. In the measurement, a macro program for automatic centering (two-diametrical direction approach) to measure the center of the bore of each of the calibration gage 64a at the point P and the calibration gage 64b at the point Q with the touch probe 60, is executed to determine the coordinates of the point P when the angle of rotation about C-axis is 0 degree.

In steps S12 and S13, the table 12 is rotated 180 degrees, and the coordinates of the point P' are determined (FIG. 10B). The position of the rotation center O of the table 12 coincides with the midpoint of the line connecting the points P and P' (step S14).

Next, the angle of rotation of the table 12 about the C-axis is set to coincide with the direction ϕ of an inclined hole of the mold (step S15). The rotation angle is first set at the direction ϕ1 of the first inclined hole A1.

Thereafter, the table 12 is positioned at the initial position shown in FIG. 10A (step S16).

Next, the table 12 is rotated until the angle of rotation about the C-axis reaches the direction ϕ1 of the first inclined hole A1 (step S17). In step S18, the macro program for automatic centering is executed to measure the positions of the calibration gages 64a, 64b lying at the points P, Q on the table 12 (FIG. 10C).

Once the measured coordinates of the calibration gages 64a, 64b are known, the actual rotation angle ϕ'1 can be calculated.

In the subsequent step S19, a displacement angle δ about the C-axis is determined from the difference between the theoretical rotation angle ϕ1 and the actual rotation angle ϕ'1. Comparison is then made between the displacement angle δ and a tolerance β to determine whether the displacement angle δ is within the tolerable range, i.e. not exceeding the tolerance β (step S20). If the displacement angle δ is within the tolerable range, then the rotation angle ϕ1 about the C-axis is stored in the storage unit 44 (step S21), and the process is returned from step 22 to step 15 to proceed to measurement of the next inclined hole, whereas if the displacement angle δ is not within the tolerable range, the process proceeds to step S23. In step S23, the target value of the rotation angle about the C-axis, which has been set at ϕ1, is corrected to ϕ1−δ using the displacement angle. The process is then returned to step S16, and after returning the table 12 to the initial position, the measurement procedures of steps S16 to S23 are repeated with the rotation angle "ϕ1−δ" about the C-axis. The measurement and calibration process is repeated until the re-measured displacement angle δ falls within the tolerable range.

When the displacement angle δ has come to fall within the tolerable range, the corrected rotation angle ϕ1 about the C-axis is stored in the storage unit 44 in step S21.

The same measurement and calibration process is executed for the next inclined hole A2. Thus, the table 12 is rotated about the C-axis to meet the direction ϕ2 of the inclined hole A2, and the positions of the calibration gages 64a, 64b are measured, and the corrected rotation angle ϕ2 about the C-axis is stored in the storage unit 44 when the displacement angle δ has come to fall within the tolerable range. The same process is executed also for all the other inclined holes.

Such pivot angle about the A-axis and rotation angle about the C-axis as to make the respective displacement angles within tolerable ranges are measured and stored in the storage section 44 in the above-described manner for all the inclined holes A1 to An to be machined in the mold 20 before initiating machining of the holes.

A description will now be made of oblique machining as carried out in the CNC apparatus 40 by execution of a machining program, taking as an example the case of drilling the pin holes A1 to An for insertion of extrusion pins in the mold 20.

As described above, by the execution of the measurement programs, it is already known before machining by what pivot angle about the A-axis the spindle head 10 must be pivoted to bring the spindle head 10 into a tilted position precisely meeting the inclination angle θ of each inclined hole and what angle of rotation about the C-axis the table 12 must be rotated to make the spindle head 10 precisely meet the direction ϕ of each hole.

Upon actual machining, therefore, the CNC apparatus 40 reads out data on the pivot angle θ about the A-axis and data on the rotation angle ϕ about the C-axis for all the inclined holes A1 to An, as needed, and when executing drilling of each hole, instructs the A-axis control unit 48 and the C-axis control unit 49 on the corrected pivot angle about A-axis and the corrected rotation angle about C-axis instead of the angle about A-axis and the angle about C-axis instructed in the measurement program. This enables precision oblique drilling of the holes, with deflection of the spindle head 10, the columns 2 and the cross rail 6 due to gravity and a mechanical error in the table 12 being compensated.

The position ensuring system of the present invention enables oblique machining which is entirely different from the conventional oblique machining method in which a skilled worker manually performs drilling of inclined holes after manually performing setup for each hole to meet the inclination angle and the direction of the hole. Thus, the present system makes it possible to carry out literally NC-controlled, high-precision automated machining of all the inclined holes to be machined in a workpiece merely by executing a measurement program and a machining program which are prepared based on CAD data. Efficient oblique drilling, fully making use of the high speed of a five-axis machine tool, thus becomes possible. A remarkable increase in the efficiency of machining of a workpiece can be realized especially when the workpiece is a large-sized mold.

As regards machining of inclined holes, such as pin holes as shown in FIG. 3, various machining methods may be employed. Examples include, in time-series order, spot facing with an end mill, machining of a guide hole with a drill, boring with a gun drill, screw cutting with a tap, etc. The position ensuring system of the present invention is, of course, applicable to any of these processing methods.

What is claimed is:

1. A position ensuring system for correcting an error in a five-axis machine tool having, in addition to X-axis, Y-axis and Z-axis, an A-axis for pivoting of a spindle head and a C-axis for rotation of a table, thereby ensuring the position of the spindle head in oblique machining of inclined holes in a workpiece, said system comprising:

an A-axis calibration system which measures a displacement angle, which is an error between a target value and a measured value of the pivot angle of the spindle head about the A-axis as the spindle head is pivoted to meet the inclination angle of an inclined hole to be machined in a workpiece, and corrects the pivot angle about the A-axis in such a manner that the displacement angle as measured with the corrected pivot angle as a target value fall within a tolerable range, before initiating machining of the workpiece, the measurement of displacement angle being carried out for all the inclined holes to be machined by execution of a measurement program prepared based on data on the shapes, including the inclination angles and the directions, of the inclined holes to be machined;

a corrected data storage device which stores the corrected pivot angle about the A-axis for each of the inclined holes to be machined; and an A-axis control system which reads out the corrected pivot angle about the A-axis for each inclined hole upon executing a machining program for the workpiece by means of an NC apparatus, and uses the corrected pivot angle about the A-axis to pivot the spindle head when executing oblique machining of the inclined hole;

wherein the A-axis calibration system comprises:
  a spherical calibration gage the coordinates of the center of which are known;
  a probe mounted to the front end of the spindle head and having a terminal for contact with the spherical surface of the calibration gage;
  a position detector which detects a contact point between the terminal of the probe and the spherical surface of the calibration gage as the terminal is brought into contact with the spherical surface from an arbitrary direction;
  and an arithmetic unit which calculates the coordinates of a measured center of the spherical calibration gage from the positions of a plurality of contact points between the terminal of the probe and the spherical surface of the calibration gage as the terminal is brought into contact with the spherical surface from a plurality of directions, the positions of the contact points being measured in accordance with predetermined measurement procedures while keeping the spindle head in a tilted position at such a tilt angle about the A-axis that meets the inclination angle of each of the inclined holes to be machined, and calculates the displacement angle about the A-axis based on the calculated coordinates of the measured center of the spherical calibration gage and on said known coordinates of the center of the spherical calibration gage.

2. The position ensuring system according to claim 1, wherein the five-axis machine tool is a bridge-type machine tool having an X-axis for moving the table backward and forward, a Z-axis for vertically moving a cross rail which is supported by a pair of columns and vertically moves on the columns, and a Y-axis for laterally moving the spindle head along the cross rail.

3. The position ensuring system according to claim 2, wherein the workpiece is a mold to be machined with a number of oblique pin holes for insertion of extrusion pins.

4. The position ensuring system according to claim 1, wherein the workpiece is a mold to be machined with a number of oblique pin holes for insertion of extrusion pins.

\* \* \* \* \*